UNITED STATES PATENT OFFICE.

THOMAS B. ALLEN, OF TORONTO, CANADA, ASSIGNOR TO THE CARBORUNDUM COMPANY, OF NIAGARA FALLS, NEW YORK, A CORPORATION OF PENNSYLVANIA.

PROCESS OF MAKING ALUMINOUS ABRASIVES.

1,268,532.

Specification of Letters Patent.     Patented June 4, 1918.

No Drawing.     Application filed November 11, 1916. Serial No. 130,788.

*To all whom it may concern:*

Be it known that I, THOMAS B. ALLEN, a subject of the King of Great Britain, residing at Toronto, Canada, have invented a new and useful Improvement in Processes of Making Aluminous Abrasives, of which the following is a full, clear, and exact description.

This invention relates to a new and useful improvement in the manufacture of aluminous abrasives. Aluminous abrasives are now commonly made by the use of an electrically developed heat process usually consisting in subjecting aluminous ore such as emery, bauxite or clay, usually with the addition of a reducing agent, such as carbon, to heat in an electric furnace until the product is fused and then allowing it to cool and crystallize. These electrically prepared abrasives have a wide field of usefulness, nevertheless despite their great efficiency they have not succeeded in displacing the natural emery in a variety of grinding and polishing operations since they are distinguished from the latter not only in their chemical composition but also in their physical properties. They are in general of greater hardness and toughness than natural emery and for this reason certain grinding operations are best accomplished by the natural abrasive and with more economical results.

In the manufacture of artificial abrasives by electrically developed heat there are always present both in microscopic and macroscopic amounts certain impurities usually of a metallic nature or having the characteristics of reduction products, which result from the reduction of impurities in the aluminous ore either by added carbonaceous material or by the action of the electrodes. These impurities are usually compounds of metallic iron with silicon titanium or other elements and must be substantially removed before an abrasive of satisfactory properties can be produced, because usually their presence causes great difficulty in the manufacture of suitable grinding and polishing articles, especially in the proper binding of the abrasive grain. Furthermore, electrically prepared abrasives are very expensive, due to the high cost of electrodes, electric energy and the maintenance cost of electric furnace operations. Moreover, their manufacture is limited to those regions where a plentiful supply of electric energy and other necessities exists.

I have discovered that I can produce a crystalline artificial aluminous abrasive material resembling natural emery in some characteristics and can avoid all the difficulty inherent in electrically prepared abrasives by subjecting aluminous ore or aluminous mixture to fuel heat or heat generated in a combustion furnace and I have found that the combustion of fuel, oil preferably, under strongly reducing conditions gives good results in this method. In choosing a suitable mixture for melting, it is necessary to consider the abrasive qualities such as hardness, toughness and fracture that are desired. These properties are determined by the proportion of the components of the mixture and by the chemical composition of the components. I have found that substances containing from 65% to 85% of alumina, and 10% to 20% iron oxid, 3% to 10% of silica and 2% to 5% titanium oxid yield a satisfactory product. I prefer to take as a raw material a bauxite ore consisting after calcining of about 80% alumina, 10% iron oxid, 7% silica and 3% titanium oxid. Such an ore is readily selected from available bauxite ores or may be arrived at by mixing aluminous ores with the other above mentioned components. The materials are reduced to a fine state of sub-division so that all will pass through a ¼ inch mesh and preferably finer. After thoroughly mixing they are fed into a fuel heated furnace by which a thorough heating and a partial sintering may be effected. For this purpose I have found a rotary kiln lined with a suitable refractory lining to be preferable, this acting as a pre-heater. The thoroughly heated or partially sintered material is then placed in a crucible in which the final heating is accomplished. By means of oil flame a temperature of 3400°F. may be obtained and I find this is sufficient to effect the further and final fusion of the material. I find it is not necessary to have the material brought to a very liquid state, indeed for many purposes merely obtaining the material in a molten state is sufficient to yield a satisfactory product. If desired, the preheating can be dispensed with and the entire operation accomplished in a single stage with the oil fuel. During the preheating and in the final heating it is preferable to have a strongly reducing atmosphere in order that the iron oxid present assume a ferrous state in which state it has a much greater fluxing power than when in the higher state of oxidation. A final melting may be made in a graphite crucible or in a vessel lined with a suitable refractory material and the heat may be supplied indirectly or directly.

I do not limit myself to the method of heating here described, and in carrying out the operation on a large scale the heat may be accomplished by playing several jets of the oil flame upon the surface of the mass to be heated, the new material being dropped on in powdered form under the flame and an ingot be built up making the process practically continuous. The oil flame may be displaced with a flame of powdered coal or gas.

The material crystallizes on cooling, forming a dark crystalline mass characterized by great hardness. Its toughness is dependent on the components of the mixture, on the size of the ingot formed, the rate of cooling and the degree of temperature attained and may be varied depending on the uses to which the product is to be put. The product exhibits rough surfaces on fracture which aid in its use as a polishing material when same is glued on to cloth or polishing wheels. The product is free from impurities such as reduction products containing iron and after crushing to a suitable degree of fineness and sifting may be made up without further treatment into abrasive wheels, blocks, etc. This results in great economy in its manufacture.

The present invention is not limited to the details of procedure hereinbefore set forth, but may be practised with various variations within the scope of the following claims.

I claim:

1. The process of making crystalline aluminous abrasives, which comprises subjecting an aluminous ore, the major portion of which consists of alumina and which contains fifteen per cent. or more of iron oxid and silica, to fuel heat in a reducing atmosphere and of a character to fuse the material, substantially as described.

2. The process of making crystalline aluminous abrasives, which comprises the steps of subjecting a mixture, the major portion of which consists of alumina and which contains fifteen per cent. or more of iron oxid and silica, to a high temperature produced by fuel heat under strong reducing conditions sufficient to cause the mixture to fuse, and then allowing the fused mass to cool and crystallize, substantially as described.

3. The process of making crystalline aluminous abrasives, comprising the steps of heating a mixture composed mainly of alumina and containing more than ten per cent. of iron oxid and silica until sintering occurs, subjecting the sintered mass to fuel heat sufficient to fuse the same, and then allowing the fused mass to cool and crystallize, substantially as described.

4. The process of making crystalline aluminous abrasives, which comprises fusing aluminous ore consisting mainly of alumina and containing fifteen per cent. or more of iron oxid and silica, by fuel heat, and allowing the fused mass to cool and crystallize, substantially as described.

5. In the manufacture of crytalline aluminous abrasives, the method which consists in preheating a mixture composed mainly of alumina and containing fifteen per cent. or more of iron oxid and silica until partial sintering occurs, and then subjecting the partially sintered mass to further heat sufficient to fuse it, substantially as described.

6. The process of making crystalline aluminous abrasives, which consists in preheating an aluminous material. consisting mainly of alumina containing fifteen per cent. or more of iron oxid or silica, fusing the preheated mixture by fuel heat, and allowing the fused mass to cool and crystallize, substantially as described.

7. The process of making crystalline aluminous abrasives, comprising the steps of applying the heat of fuel combustion directly to an aluminous material, consisting mainly of alumina and containing fifteen per cent. or more of iron oxid and silica to fuse the same, and allowing the fused mass to cool and crystallize, substantially as described.

In testimony whereof, I have hereunto set my hand.

THOMAS B. ALLEN.

Witnesses:
SAM'L S. DIEMN,
ARTHUR BATTS.